| United States Patent [19] | [11] Patent Number: 4,800,065 |
|---|---|
| Christodoulou et al. | [45] Date of Patent: Jan. 24, 1989 |

[54] PROCESS FOR MAKING CERAMIC-CERAMIC COMPOSITES AND PRODUCTS THEREOF

[75] Inventors: Leontios Christodoulou, Baltimore; Dennis C. Nagle, Ellicott City; John M. Brupbacher, Catonsville, all of Md.

[73] Assignee: Martin Marietta Corporation, Bethesda, Md.

[21] Appl. No.: 122,306

[22] Filed: Nov. 18, 1987

Related U.S. Application Data

[63] Continuation-in-part of Ser. No. 943,899, Dec. 19, 1986, Pat. No. 4,710,348, which is a continuation of Ser. No. 662,928, Oct. 19, 1984, abandoned.

[51] Int. Cl.$^4$ .......................... C22C 1/10; C22C 32/00
[52] U.S. Cl. ...................................... 420/129; 420/590
[58] Field of Search ................................ 420/129, 590

[56] References Cited

U.S. PATENT DOCUMENTS

| 2,852,366 | 9/1958 | Jenkins | 419/10 |
|---|---|---|---|
| 3,194,656 | 7/1965 | Vordahl | 420/590 |
| 3,415,697 | 12/1968 | Bredzs et al. | 148/27 |
| 3,547,673 | 12/1970 | Bredzs et al. | 419/10 |
| 3,666,436 | 5/1972 | Bredzs et al. | 420/436 |
| 3,672,849 | 6/1972 | Bredzs et al. | 428/667 |
| 3,690,849 | 9/1972 | Bredzs et al. | 77/244 |
| 3,690,875 | 9/1972 | Bredzs et al. | 419/23 |
| 3,705,791 | 9/1972 | Bredz | 148/425 |
| 3,726,643 | 4/1973 | Merzhanov et al. | 423/439 |
| 3,728,108 | 4/1973 | Sifferlen et al. | 420/590 |
| 3,785,807 | 1/1974 | Backerud | 75/68 R |
| 4,161,512 | 7/1979 | Merzhanov et al. | 423/439 |
| 4,431,448 | 2/1984 | Merzhanov et al. | 419/17 |
| 4,444,603 | 4/1984 | Yamatsuta et al. | 428/614 |
| 4,514,268 | 4/1985 | De Angelis | 501/96 |
| 4,540,546 | 9/1985 | Giessen | 420/129 |
| 4,579,587 | 4/1986 | Grant et al. | 420/590 |
| 4,605,440 | 8/1986 | Halverson et al. | 501/87 |
| 4,623,402 | 11/1986 | Maximov et al. | 420/129 |
| 4,710,358 | 12/1987 | Brupbacher et al. | 420/129 |
| 4,751,048 | 6/1988 | Christodoulou et al. | 420/129 |

FOREIGN PATENT DOCUMENTS

| 0113249 | 12/1983 | European Pat. Off. | |
| 0962479 | 7/1964 | United Kingdom | 420/129 |
| 0962480 | 7/1964 | United Kingdom | 420/129 |

*Primary Examiner*—L. Dewayne Rutledge
*Assistant Examiner*—David Schumaker
*Attorney, Agent, or Firm*—Herbert W. Mylius; Gay Chin

[57] ABSTRACT

This invention relates to ceramic-ceramic composites comprising a dispersion of ceramic particles in a ceramic matrix. The production of these composites involves the in-situ precipitation of ceramic particles in a solvent metal matrix and the conversion of the matrix to a ceramic by reacting it with a matrix reactive species. Exemplary ceramic dispersoids include $TiB_2$, $ZrB_2$, $TiC$ and $TiN$. Exemplary ceramic matrices include $AlN$, $Al_2O_3$ and $SiO_2$.

42 Claims, No Drawings

PROCESS FOR MAKING CERAMIC-CERAMIC COMPOSITES AND PRODUCTS THEREOF

This application is a continuation-in-part of U.S. patent application Ser. No. 943,899, filed Dec. 19, 1986, now U.S. Pat. No. 4,710,348 which is a continuation of U.S. patent application Ser. No. 662,928, filed Oct. 19, 1984, now abandoned.

FIELD OF INVENTION

The field of the invention relates to a process for forming ceramic composite materials. These composites are called "ceramic-ceramic composites", that is, a dispersion of particulate ceramic material in a ceramic matrix. This method involves in-situ precipitation of a ceramic phase in a solvent ceramic precursor matrix, followed by conversion of the matrix to a ceramic by reacting it with a matrix reactive species. This invention also relates to products and coatings made by this method.

BACKGROUND OF THE INVENTION

Ceramics in general have many uses, especially in applications requiring light weight, high temperature resistant materials. However, the use of ceramics is often limited due to their inherent brittleness. As opposed to monolithic ceramics, ceramic-ceramic composites offer greater structural reliability because they generally do not catastrophically fail upon initial macroscopic cracking of the matrix. The increased toughness achieved by ceramic-ceramic composites allows for use in applications where brittle, monolithic ceramics are unsatisfactory.

A particular monolithic ceramic which has been of considerable interest in recent years is silicon nitride. Properties such as retention of mechanical strength and creep resistance at high temperature and exceptionally good resistance to thermal shock, for a brittle material, have led to the use of silicon nitride in applications such as high temperature engine components. Formation of silicon nitride components may be achieved by the direct reaction of silicon powder with nitrogen to form $Si_3N_4$ powder, followed by conventional sintering or hot pressing techniques to form a shaped article. Alternatively, silicon nitride components may be produced directly by a method known as reaction bonding. In this process, a silicon powder compact is converted into $Si_3N_4$ by heating in a nitrogen atmosphere. The reaction bonding technique has the merit that only slight overall volume change occurs during the nitridation process, so that complex, accurately dimensioned shapes can be produced in a single stage from a shaped billet of silicon powder. However, the use of silicon nitride in components requiring, for example, structural integrity, has been limited due to the inherent brittleness of the material.

Known ceramic-ceramic composites are produced by conventional powder processing techniques which involve mixing dissimilar ceramic powders followed by a heating process to obtain a dispersion of one of the starting ceramics in a matrix of the other starting ceramic. The grain size of the resultant ceramic composite depends upon the size of the starting powders used. Difficulties are encountered as the size of the starting powders is decreased due to a tendency for the very fine powders to agglomerate. Also, very fine ceramic powders are often not commercially available. Further, in many cases where the particulate materials are available in the desired size, they are extremely hazardous due to their pyrophoric nature. The temperatures involved in conventional consolidation techniques are typically very high, which may result in growth of the ceramic particles along with unwanted reactions between the different ceramic components. As an alternative, sol-gel technology has been investigated because this route offers the potential for finer particles of more uniform dispersion than possible by conventional processing. See H. Palmour III et al., *Processing of Crystalline Ceramics,* Plenum Press (1978), hereby incorporated by reference. However, sol-gel techniques incorporate a wet processing step which complicates processing, i.e., the gel must first be dried and/or calcined. This technique also includes the use of relatively high temperature which is likely to promote grain growth and reactions between different components.

Refractories, such as those referred to above, can be hot pressed at very high temperatures using a non-oxidizing or inert atmosphere, such as nitrogen, helium, argon or a vacuum to form ceramics. However, such high temperatures similarly favor undersirable rapid particle growth and undesireable side reactions. See, for example, U.S. Pat. Nos. 2,670,301; 2,839,413; 3,011,983; 3,291,623; and 4,512,946.

For the past several years, extensive research has been devoted to the development of metal-ceramic composites, such as aluminum reinforced with carbon, boron, silicon carbide, silica, or alumina fibers, whiskers, or particles. Metal-ceramic composites with good high temperature yield strengths and creep resistance have been fabricated by the dispersion of very fine (less than 0.1 micron) oxide or carbide particles throughout the metal or alloy matrix. However, this metal ceramic composite technology has not heretofore been extended to include ceramic matrices. Prior art techniques for the production of metal-ceramic composites may be broadly categorized as powder metallurgical approaches, molten metal techniques, and internal oxidation processes.

The powder metallurgical type production of such dispersion-strengthened composites would ideally be accomplished by mechanically mixing metal powders of approximately 5 micron diameter or less with the oxide or carbide powder (preferably 0.01 micron to 0.1 micron). High speed blending techniques or conventional procedures such as ball-milling may be used to mix the powder. Standard powder metallurgy techniques are then used to form the final composite. Conventionally, however, the ceramic component is large, that is, greater than 1 micron, due to a lack of availability, and high cost, of very small particle size materials because their production is energy intensive, time consuming, and costly in capital equipment. Furthermore, production of very small particles inevitably leads to contamination of the particles with oxides, nitrides, and materials from various sources. The presence of these contaminants inhibits particulate-to-metal bonding, which in turn compromises the mechanical properties of the resultant composites.

Alternatively, it is known that proprietary processes exist for the direct addition of appropriately coated ceramics to molten metals. Further, molten metal infiltration of a continuous ceramic skeleton has been used to produce composites. In most cases, elaborate particle coating techniques have been developed to protect the ceramic particles from the molten metal during admixture or molten metal infiltration, and to improve bonding between the metal and ceramic. Techniques such as these have resulted in the formation of silicon carbide-aluminum composites, frequently referred to as SiC/Al, or SiC aluminum. This approach is only suitable for large particulate ceramics (for example, greater than 1 micron) and whiskers, because of the high pressures involved for infiltration. The ceramic material, such as silicon carbide, is pressed to form a compact, and liquid metal is forced into the packed bed to fill the intersticies. Such a technique is illustrated in U.S. Pat. No. 4,444,603, of Yamatsuta et al, issued Apr. 24, 1984 and hereby incorporated by reference. Because of the necessity for coating techniques and molten metal handling equipment capable of generating extremely high pressures, molten metal infiltration has not been a practical process for making metal-ceramic composites.

Internal oxidation of a metal containing a more reactive component has been used to produce dispersion strengthened metals, such as internally oxidized aluminum in copper. For example, when a copper alloy containing about 3 percent aluminum is placed in an oxidizing atmosphere, oxygen may diffuse through the copper matrix to react with the aluminum, precipitating alumina. This technique, although limited to relatively few systems because the two metals utilized must have a wide difference in chemical reactivity, has offered a feasible method for dispersion hardening. However, the highest possible level of dispersoids formed in the resultant dispersion strengthened metal is generally insufficient to impart significant changes in properties such as modulus, hardness, and the like. In addition, oxides are typically not wetted by the metal matrix, so that interfacial bonding is not optimum.

Because of the above-noted difficulties with conventional processes, preparation of metal-ceramic composites with submicron ceramic dispersoids for commercial applications has been extremely expensive.

In U.S. Pat. No. 2,852,366 to Jenkins, hereby incorporated by reference, it is taught that up to 10 by weight of a metal complex can be incorporated into a base metal or alloy. The patent teaches blending, pressing, and sintering a mixture of a base metal, a compound of the base metal and a non-metallic complexing element, and an alloy of the base metal and the complexing metal. Thus, for example, the reference teaches mixing powders of nickel, a nickel-boron alloy, and a nickel-titanium alloy, pressing, and sintering the mixed powders to form a coherent body in which a stabilizing unprecipitated "complex" of titanium and boron is dispersed in a nickel matrix. Precipitation of the complex phase is specifically avoided.

In U.S. Pat. No. 3,194,656, hereby incorporated by reference, Vordahl teaches the formation of a ceramic phase, such as $TiB_2$ crystallites, by melting a mixture of eutectic or near eutectic alloys. It is essential to the process of Vordahl that at least one starting ingredient has a melting point substantially lower than that of the matrix metal of the desired final alloy. There is no disclosure of the initiation of an exothermic second phase-forming reaction at or near the melting point of the matrix metal.

Bredzs et al, in U.S. Pat. Nos. 3,145,697; 3,547,673; 3,666,436; 3,672,849; 3,690,849; 3,690,875; and 3,705,791, hereby incorporated by reference, teach the preparation of cermet coatings, coated substrates, and alloy ingots, wherein an exothermic reaction mechanism forms an in-situ precipitate dispersed in a metal matrix. Bredzs et al rely on the use of alloys having a depressed melting temperature, preferably eutectic alloys, and thus do not initiate a second phase-forming exothermic reaction at or near the melting temperature of the matrix metal.

DeAngelis, in U.S. Pat. No. 4,514,268, hereby incorporated by reference, teaches reaction sintered cermets having very fine grain size. The method taught involves the dual effect of reaction between and sintering together of admixed particulate reactants that are shaped and heated at temperatures causing an exothermic reaction to occur and be substantially completed. The reaction products are at least partially sintered together by holding the reaction mass at the high temperatures attained to form a body comprising aluminum metal and a ceramic skeleton. Thus, this reference relates to a product with sintered ceramic bonds suitable for use in contact with molten metal.

Backerud, in U.S. Pat. No. 3,785,807, hereby incorporated by reference, teaches the concept of preparing a master alloy for aluminum, containing titanium diboride. The patentee dissolves and reacts titanium and boron in molten aluminum at a high temperature, but requires that titanium aluminide be crystallized at a lower temperature around the titanium diboride formed. Thus, the patent teaches formation of a complex disperoid.

Recently, there has been considerable effort to produce various ceramic materials by gasless combustion synthesis. See, for example, W. L. Frankhouser et al., *Synthesis of Refractory Compounds with Gasless Combustion Reactions,* Final Report No. SPC 931, DARPA. (Sept., 1983), hereby incorporated by reference. This method typically involves the direct combination of elemental materials to produce ceramics. The non-isothermal reaction is marked by a substantial energy release which heats the materials above the melting point of the product ceramic.

In recent years, numerous ceramics have been formed using a process termed "self-propagating high-temperature synthesis" SHS). It involves an exothermic, self-sustaining reaction which propagates through a mixture of compressed powders. The SHS process involves mixing and compacting powders of the constituent elements and igniting a portion of a green compact with a suitable heat source. The source can be electrical impulse, laser, thermite, spark, etc. On ignition, sufficient heat is released to support a self-sustaining reaction, which permits the use of sudden, low power initiation at high temperatures, rather than bulk heating over long periods at lower temperatures. Exemplary of these techniques are the patents of Merzhanov et al, U.S. Pat. Nos. 3,726,643; 4,161,512; and 4,431,448, among others, hereby incorporated by reference.

In U.S. Pat. No. 3,726,643, there is taught a method for producing high-melting refractory inorganic compounds by mixing at least one metal selected from Groups IV, V, and VI of the Periodic System with a non-metal, such as carbon, boron, silicon, sulfur, or liquid nitrogen, and heating the surface of the mixture to produce a local temperature adequate to initiate a combustion process. In U.S. Pat. No. 4,161,512, a process is taught for preparing titanium carbide by ignition of a mixture consisting of 80–88 percent titanium and 20–12 percent carbon, resulting in an exothermic reaction of the mixture under conditions of layer-by-layer combustion. These references deal with the preparation of ceramic materials, absent a binder.

When the SHS process is used with an inert metal phase, it is generally performed with a relatively high volume fraction of ceramic and a relatively low volume fraction of metal (typically 10 percent and below, and almost invariably below 30 percent). The product is a dense, sintered material wherein the relatively ductile metal phase acts as a binder or consolidation aid which, due to applied pressure, fills voids, etc., thereby. increasing density. The SHS process with inert metal phase occurs at higher temperatures than the in-situ precipitation process used in conjunction with the present invention, and is non-isothermal, yielding sintered ceramic particles having substantial variation in size.

U.S. Pat. No. 4,431,448 teaches preparation of a hard alloy by intermixing powders of titanium, boron, carbon, and a Group I-B binder metal or alloy, such as an alloy of copper or silver, compression of the mixture, local ignition thereof to initiate the exothermic reaction of titanium with boron and carbon, and propagation of the ignition, resulting in an alloy comprising titanium diboride, titanium carbide, and up to about 30 percent binder metal. This reference, however, is limited to the use of Group I-B metals or alloys, such as copper and silver, as binders. Products made by this method have low density, and are subjected to subsequent compression and compaction to achieve a porosity below 1 percent.

U.S. Pat. No. 4,540,546 to Giessen et al, hereby incorporated by reference, teaches a method for rapid solidification processing of a multiphase alloy. In this process two starting alloys react in a mixing nozzle in which a "Melt Mix Reaction" takes place between chemically reactable components in the starting alloys to form submicron particles of the resultant compound in the final alloy. The mixing and chemical reaction are performed at a temperature which is at or above the highest liquidus temperature of the starting alloys, but which is also substantially below the liquidus temperature of the final alloy, and as close to the solidus temperature of the final alloy as possible. The mixing and reaction also occurs in a non-reactive atmosphere (H, He, Ar, N) or a cooling fluid. While dispersion-strengthened alloys can be produced by this technique, there appear to be a number of inherent difficulties. First, processing is technically complex, requiring multiple furnaces. Second, efficient mixing is important if fine dispersions are to be consistently produced. Lastly, very high degrees of superheat will be required to completely dissolve the rapid solidification alloying elements in order to produce high loading of dispersoid, which necessarily accentuates particle growth, for example, in composites containing 10-20% dispersoid.

European patent application No. 113,249, filed Dec. 29, 1983, by Reeve et al., teaches a cermet material comprising an intergrown network of a minor proportion of ceramic such as $TiB_2$ in a metal matrix such as Al. The cermet is prepared by forming a minor proportion by weight of a non-particulate ceramic phase in-situ in a molten metal phase and holding the mixture at an elevated temperature for a time to form an intergrown ceramic network. The molten metal phase is reactive with a precursor such as gaseous or solid carbon, boron and/or nitrogen in elemental form or as a bearing component to yield products having ceramic characteristics. The network has larger grains than those possible in the present invention.

The present invention overcomes the disadvantages of the prior art noted above. The present invention also permits simplification of procedures and equipment compared to the prior art. For example, the present process obviates the need for multiple furnaces and mixing and control equipment because all of the constituents of the second phase are reacted in a single reaction vessel. The present invention additionally overcomes the need for forming multiple melts of components at very high melting temperatures. Further, high loading composites can be prepared without the necessity of achieving high levels of superheat in holding furnaces.

The invention provides a cleaner particle/metal interface compared with conventional metal-ceramic composites made by techniques using, for example, separate metal and ceramic powders, because the reinforcing particles are formed in-situ, and thus permits formation of a ceramic-ceramic composite having an improved interface.

The preceding features permit a mechanism for producing finer second phase particles in the ceramic-ceramic composite than are possible by classical powder routes. Also, the present process obviates the need for intimate mixing, compacting, and sintering of vety fine ceramic powders associated with conventional techniques and avoids non-uniform green density, differential sintering, and grain growth problems. A cleaner ceramic/ceramic interface is obtained by. the present invention, due to the in-situ formation of the ceramic particles. Using certain embodiments of the invention, grain growth and interparticle reactions often encountered in complex systems are avoided because a single phase is provided for subsequent treatment, that is, the precipitates from the second phase-forming reaction may serve as nuclei for the ceramic matrix forming reaction and become encapsulated.

With these facts in mind, a detailed description of the invention follows, which achieves advantages over known processes and products.

SUMMARY OF INVENTION

It is an object of the present invention to provide an inexpensive method for forming composite materials, comprising a finely dispersed in-situ precipitated, ceramic second phase formed in a ceramic precursor matrix which is reacted with a matrix reactive species to form a final ceramic matrix. For purposes of simplifying further description, the ceramic matrix of the final composite sought may be referred to as the "final matrix" or "final ceramic matrix".

In one embodiment of the present invention, a composite is produced comprising a relatively concentrated ceramic second phase dispersion in a "ceramic precursor matrix." The ceramic precursor matrix comprises a "solvent metal," a metal, metal alloy, or intermetallic, in which the ceramic second phase-forming reactants are more soluble than the ceramic second phase, and is different than the final matrix desired. Subsequently, the ceramic precursor matrix is reacted with a matrix reactive species to convert the precursor to a ceramic final matrix. The composite comprising ceramic particles in a ceramic precursor matrix, which may be in the form of a porous "sponge," is utilized to form improved ceramic-ceramic composites. Alternatively, the ceramic precursor matrix may be melted to form a dispersion of the ceramic particles in a molten bath, followed by reaction of the ceramic precursor with a matrix reactive species, to form the desired ceramic-ceramic composite.

In another embodiment of the present invention, prior to formation of the final ceramic-ceramic composite, the matrix of the composite comprising ceramic particles in a ceramic precursor matrix can be dissolved in a "host metal" which is a metal, metal alloy, or intermetallic, in which the ceramic second phase particles are insoluble and which when combined with the ceramic precursor matrix will yield a "final ceramic precursor matrix" which upon reaction with a matrix reactive species, can be converted to the final ceramic matrix. The dissolution of the ceramic precursor matrix may be accomplished by admixture of the composite with a molten bath of host metal, metal alloy, or intermetallic, or with solid host metal, metal alloy, or intermetallic followed by heating to a temperature above the melting point of the ceramic precursor matrix.

In each of the above embodiments, wherein the matrix of a composite material is subsequently reacted with a matrix reactive species, it is possible to achieve a total or partial conversion of the matrix to ceramic. In the case of partial conversion, a graded matrix may be obtained comprising ceramic in exposed areas and metal in interior areas, having a zone of gradual change from predominantly ceramic to predominantly metal in between. This gradient zone may thus avoid problems caused by, for example, a difference in the coefficient of thermal expansion between ceramic and metallic materials at a distinct ceramic/metal interface.

As utilized herein, the term "solvent metal" or "solvent ceramic precursor" shall refer to the reaction medium in which the ceramic phase-forming reactants combine or react, while the term "ceramic precursor matrix" shall refer to the precipitate-containing matrix which may be converted to ceramic upon reaction with a matrix reactive species, or which may be dissolved in a host metal to produce a "final ceramic precursor matrix" which may then be converted to ceramic.

DESCRIPTION OF PREFERRED EMBODIMENTS

The present invention incorporates a process for the in-situ precipitation of fine particulate ceramic second phase, such as refractory hard metal borides, carbides or nitrides within a ceramic precursor matrix, that is converted to a final ceramic matrix, to recover a ceramic-ceramic composite having enhanced properties.

The present invention constitutes a process whereby second phase-forming reactants react in a solvent ceramic precursor to form a finely-divided dispersion of the second phase material in a ceramic precursor matrix. Thereafter, a matrix reactive species converts the ceramic precursor matrix to a final ceramic matrix. For example, titanium and boron second phase-forming reactants may be reacted in the presence of an aluminum solvent ceramic precursor to form a dispersion of titanium diboride particles within an aluminum ceramic precursor matrix. The aluminum ceramic precursor matrix of the thus produced composite may then be reacted with nitrogen to convert the aluminum matrix to an aluminum nitride matrix. The final ceramic-ceramic composite, as produced, would comprise titanium diboride particles in an aluminum nitride matrix.

For the example given above utilizing aluminum as a solvent ceramic precursor, it has been found that the reaction commences, or is initiated, at a temperature far below the temperature conventionally required for the reaction sought absent the solvent ceramic precursor. In general, the second phase-forming reactants most easily combine at or about the melting temperature of the solvent ceramic precursor, and the exothermic nature of this reaction may cause a very rapid temperature elevation or spike, which has the effect of melting additional solvent ceramic precursor material, simultaneously causing the further reaction of the second phase-forming reactants. While the discussion herein focuses upon the production of ceramic second phase dispersoids, the production of additional second phase materials, such as intermetallics, is considered to be within the scope of the present invention.

The ceramic-ceramic composite may comprise from about 5 volume percent up to about 90 volume percent second phase, and more preferably from about 10 volume percent to about 70 volume percent second phase.

The size of the second phase particles may range from about 0.05 to about 10 microns, preferably from about 0.1 to 5 microns, and more preferably from about 0.5 to 2.0 microns.

Exemplary of suitable second phase precipitates are ceramics such as the borides, carbides, oxides, nitrides, silicides, oxynitrides, sulfides, and oxysulfides. Preferred second phase particles include refractory borides, carbides, and nitrides, such as $TiB_2$, $ZrB_2$, TiC, and TiN.

Suitable second phase-forming reactants include all of the elements which are reactive to form ceramic precipitates, including, but not limited to, transition elements of the third to sixth groups of the Periodic Table. Particularly useful ceramic phase forming constituents include aluminum, titanium, silicon, boron, carbon, oxygen, nitrogen, sulfur, molybdenum, tungsten, niobium, vanadium, zirconium, chromium, hafnium, cobalt, nickel, iron, magnesium, tantalum, manganese, zinc, lithium, beryllium, thorium, and the rare earth elements including scandium, yttrium, lanthanum, and the lanthanide series elements such as cerium and erbium. Compounds such as boron nitride, boron carbide, boron oxide, aluminum boride, aluminum carbide, aluminum nitride, silicon carbide, copper oxide, and iron oxide may also be used as a source of second phase-forming reactants.

It is especially noteworthy that plural dispersoids, and/or complex compounds such as titanium zirconium boride, may advantageously be precipitated in-situ in the ceramic precursor matrix. Accordingly, in this discussion, it is understood that multiple ceramic dispersoids and/or multiple ceramic matrices also are intended to be included.

As the solvent ceramic precursor, a material capable of dissolving or at least sparingly dissolving, the second phase-forming reactants, and having a lesser capability for dissolving or otherwise reacting with the formed ceramic second phase precipitate, is used. Thus, at the temperatures experienced during the process, the solvent ceramic precursor must act as a solvent for the second phase-forming reactants, but not for the desired second phase precipitate. It is especially to be noted that the second phase-forming reactants have a greater affinity for each other than either has for the solvent ceramic precursor. In addition, solvent ceramic precursors may individually, or collectively, act as solvent materials for the second phase-forming reactants. Thus, the second phase-forming reactants, but not the ceramic second phase itself, must be soluble in at least one of the solvent ceramic precursors. Further, the solvent ceramic precursor must be capable of forming a ceramic upon reaction with a matrix reactive species. Therefore, while the potential choice of second phase-forming reactants and solvent ceramic precursors is large, this choice is limited by adherence to the criteria hereinabove recited.

The solvent ceramic precursor materials may be aluminum, nickel, titanium, cobalt, iron, niobium, tantalum, boron, molybdenum, yttrium, hafnium, tin, tungsten, lithium, magnesium, beryllium, thorium, silicon, chromium, vanadium, zirconium, manganese, scandium, lanthanum, rare earth elements, and alloys thereof. Preferred solvent ceramic precursors include aluminum, nickel, titanium, cobalt, iron, and refractory metals. Plural solvent ceramic precursor materials may, of course, be present to form the ceramic precursor matrix. It is noted that the term ceramic precursor matrix, as used herein, is meant to define a matrix which is predominantly metal, although other materials, e.g., intermetallics, may also be present in lesser amount.

Intermetallics are suitable in the present invention for ceramic precursor matrices. In such instance, the intermetallic material forming a ceramic precursor matrix may be prepared from the preceding group of solvent ceramic precursor materials.

As the matrix reactive species one may use elements or compounds comprising elements which are reactive with the solvent ceramic precursor materials, as given above, to form ceramics. However, the reactive species chosen must not be reactive with the second phase precipitates. The matrix reactive species may be in the gaseous, liquid or solid state. Examples of gaseous reactive species include nitrogen, oxygen, boron trifluoride, boron trichloride, carbon monoxide, carbon dioxide, and the like. Liquid reactive species include hydrocarbons such as methane, while solid reactive species include carbon (in the form of carbon black or graphite), boron, boron nitride, and azides, such as $NaN_3$.

Suitable final ceramic matrices include borides, carbides, oxides, nitrides, oxynitrides, sulfides, oxysulfides, and silicides. Preferred final ceramic matrices include $Si_3N_4$, AlN, TiN, SiC, TiC, $SiO_2$, and $Al_2O_3$.

Methods of preparation of the ceramic-ceramic composites of the present invention include the following: (A) A process wherein a composite comprising in-situ precipitated ceramic second phase in a ceramic precursor matrix is formed and subsequently reacted with a matrix reactive species to form a ceramic-ceramic composite; (B) A process similar to (A) above, wherein a previously formed composite comprising in-situ precipitated ceramic second phase in a ceramic precursor matrix is used but additionally formed into a near net shape by conventional forming processes and then reacted with a matrix reactive species to form a shaped ceramic-ceramic composite.

In method (A) set forth above, a composite comprising second phase particles dispersed in a ceramic precursor matrix is prepared and then further reacted with a matrix reactive species using conventional processing conditions to form a ceramic-ceramic composite. The technique for forming the ceramic precursor-second phase composite can take place via four different modes, all utilizing an in-situ precipitated dispersoid. A discussion of the four modes follows.

The fundamental in-situ precipitation process is directed to the in-situ precipitation of fine particulate ceramics, such as refractory hard metal borides, carbides and nitrides within metal and alloy systems to produce metal matrix composites. More particularly, it is a method whereby ceramic forming reactants react in a solvent ceramic precursor to form a finely-divided dispersion of the ceramic material in a ceramic precursor matrix. In this embodiment, an exothermic second phase-forming reaction is initiated by bulk heating of the second phase-forming reactants and the solvent ceramic precursor. This fundamental or bulk heating technique is described in greater detail in U.S. patent application Ser. No. 943,899, filed Dec. 19, 1986, hereby incorporated by reference, of which this application is a continuation-in-part.

In accordance with the fundamental in-situ precipitation process, the second phase-forming reaction may be initiated in different physical states. Thus, a second phase-forming reaction between elemental powders of second phase-forming reactants and the solvent ceramic precursor can be initiated in a plasma arc or flame, or via diffusion of the second phase-forming reactants through the liquid solvent ceramic precursor, or, in cases where solid phase diffusion is rapid, in a solid state. In the case where two alloys are used, each containing a second phase-forming reactant alloyed with a solvent ceramic precursor, the reaction can also occur in the solid state, liquid state, gaseous state, or in a plasma arc or flame achieved, for example, by striking an arc between electrodes of the two alloys.

In an alternative mode, porous composites comprising second phase dispersoids in a ceramic precursor matrix are formed using a local ignition process. It involves mixing and compressing powders of second phase-forming reactants and a solvent ceramic precursor to form a green compact, followed by local ignition to initiate a substantially isothermal wave front which moves along the compact. The propagating reaction results in the in-situ precipitation of substantially insoluble second phase particles in a ceramic precursor matrix. The substantially isothermal wave front, which promotes uniformity of ceramic particle size, results from the high thermal conductivity of the solvent ceramic precursor, in combination with concentrations of the solvent ceramic precursor sufficient to achieve an isothermal character across the material to be reacted. The porosity more preferably exceeds about 25 percent. In accordance with the present invention, the ceramic precursor matrix of the porous composite is then reacted with a matrix reactive species to form a final ceramic matrix. The production of second phase/ceramic precursor matrix composites using a local ignition process is discussed in greater detail in U.S. patent application Ser. No. 927,014, filed Nov. 5, 1986, hereby incorporated by reference.

Another mode for the production of composites which are suitable for conversion to ceramic-ceramic composites in accordance with the present invention relates to a sponge addition process for forming second phase composite materials having a relatively uniform dispersion of second phase particles throughout a "final ceramic precursor matrix". The process comprises precipitating at least one second phase material in a ceramic precursor matrix by contacting second phase-forming reactants in the presence of a solvent ceramic precursor, at a temperature at which sufficient diffusion of the reactants into the solvent ceramic precursor occurs to initiate the reaction of the constituents to produce a first composite material comprising a relatively high concentration of finely divided particles of second phase material in a ceramic precursor matrix. This first composite material, or "sponge", is then introduced into a molten host metal, metal alloy or intermetallic to obtain a second composite comprising the second phase within a final ceramic precursor matrix. The sponge addition process is explained in greater detail in U.S. patent application Ser. No. 927,032, filed Nov. 5, 1986, hereby incorporated by reference.

Another alternative mode relates to a direct addition method for the preparation of second phase composites by direct addition of a mixture of second phase-forming reactants and a solvent ceramic precursor to a molten matrix metal, resulting in the in-situ formation of finely dispersed second phase particles within a ceramic precursor matrix. The second phase-forming reactants may be added as a preform or compact of individual powders of reactive elements or reactive compounds and solvent ceramic precursor. It is to be noted that a solvent ceramic precursor must be present in the preform or compact to facilitate the reaction of the second phase-forming reactants. This process, which may be referred to as the direct addition process, is discussed in greater detail in U.S. patent application Ser. No. 927,031, filed Nov. 5, 1986, hereby incorporated by reference.

In accordance with method (A) of the present invention, the previously formed composite from each of the four modes may be reacted under appropriate temperatures and pressures with a matrix reactive species to convert the ceramic precursor matrix of the composite to a final ceramic matrix. For example, a composite produced by any of the four modes disclosed above may be placed in an autoclave containing a gaseous matrix reactive species at super-atmospheric pressure. The temperature (for example 80% of the melting point of the ceramic precursor matrix) may be maintained for a suitable amount of time to achieve the desired conversion of the ceramic precursor matrix to a final ceramic matrix. As a specific example using a gaseous matrix reactive species, a composite comprising $TiB_2$ particulates in an Al ceramic precursor matrix may be placed in an autoclave under a $N_2$ atmosphere at a pressure of 30,000 psi and a temperature of 550° C. for 24 hours to convert the surface of the Al ceramic precursor matrix to AlN, thus producing a $TiB_2$-AlN final ceramic-ceramic composite. In the case where a solid matrix reactive species is used, the composite may be crushed and mixed with a powder of the matrix reactive species followed by pressing of the mixture at elevated temperature to achieve conversion.

It is noted that when maintenance of the dimensional stability of the composite is desired, the temperatures involved in the conversion process are typically held below the melting point of the ceramic precursor matrix undergoing the conversion. Where maintaining dimensional stability is not necessary, reaction kinetics may be enhanced by working at higher temperatures, i.e., above the melting point of the ceramic precursor matrix. For example, the ceramic precursor matrix may be held in the molten state and progressively reacted with a matrix reactive species under controlled temperature conditions. In this case, the addition of dopants to the molten ceramic precursor may enhance the formation of the final ceramic matrix. In accordance with hhe present invention, temperatures at which sintering of the ceramic particles would occur should be avoided. Additionally, the time at temperature during which the conversion reaction occurs may be controlled to achieve either complete or partial conversion of the ceramic precursor matrix to ceramic.

In accordance with method (A), coatings and sprayed structures comprising ceramic-ceramic composite materials may be produced by plasma spray techniques. This process involves the conversion of the ceramic precursor matrix of composites, produced by any of the four modes disscused above, utilizing a plasma gas comprising a matrix reactive species. Accordingly, a ceramic-ceramic precursor matrix composite may be crushed to appropriate size and introduced into a plasma flame. The plasma gas, which is comprised of a matrix reactive species, reacts with the ceramic precursor matrix to form the desired ceramic-ceramic composite. For example, a composite comprising $TiB_2$ particles in a Si ceramic precursor matrix may be crushed and introduced into an $O_2$ containing plasma flame. The $O_2$ matrix reactive species reacts with the Si ceramic precursor matrix to form a composite comprising $TiB_2$ particles in a $SiO_2$ final ceramic matrix. This plasma spray. technique allows for the production of ceramic-ceramic coatings by. spraying onto a substrate. Additionally, ceramic-ceramic structures may be formed by building-up layer upon layer of the plasma sprayed material.

A variation of method (A) involves reaction of the ceramic phase-forming reactants and the solvent ceramic precursor in the presence of a matrix reactive species to produce the desired ceramic-ceramic composite. This process involves the in-situ precipitation of ceramic particles within a ceramic precursor matrix, with either a simultaneous or subsequent conversion of the ceramic precursor matrix to ceramic as a result of the reaction between the ceramic precursor matrix and the matrix reactive species. Accordingly, the starting materials may. constitute individual powders of each of the second phase-forming reactants and the solvent ceramic precursor or powders comprising alloys of the second phase-forming reactants with the solvent ceramic precursor. Plasma spray techniques may be used in conjuntion with this process whereby a mixture of second phase-forming reactants and a solvent ceramic precursor is reacted in a plasma gas which comprises a matrix reactive species. The plasma is used to initiate the reaction between the second phase-forming reactants to form a dispersion of ceramic second phase particles in a ceramic precursor matrix. Concurrent with, or subsequent to this reaction, the ceramic precursor matrix is converted to a final ceramic matrix upon reaction with the matrix reactive species of the plasma gas. Thus, the plasma gas acts both to initiate the second phase-forming reaction and as a matrix reactive species in the production of the desired ceramic-ceramic composite.

Alternatively, in method (B), the composites produced by the sponge addition and direct addition modes discussed in method (A) above can be shaped using conventional processes before conversion of the ceramic precursor or final ceramic precursor matrix to ceramic. The conventional processes include extrusion, forging, rolling, casting, machining and other known techniques to form a near final shape. The shaped article is then treated with a matrix reactive species to convert the ceramic precursor matrix to ceramic, thus producing a ceramic-ceramic composite of desired shape. Optionally, the article may then be hot isostatically pressed to remove unwanted porosity. The conversion reaction is carried out in a manner similar to method (A) above. The time at temperature at which the shaped composite is exposed to the matrix reactive species my be varied to achieve either complete or partial conversion of the ceramic precursor matrix to ceramic. In the instance where partial conversion is achieved, the exposed outer surface of the shaped article is converted to a ceramic-ceramic composite material, while the inner core remains as a ceramic-ceramic precursor matrix composite. The article may thus be comprised of, for example, a hard, temperature resistant outer shell and a ductile, tough inner core. Further, portions of a shaped composite article may be protected from reaction with the matrix reactive species, for example by masking off certain areas, to achieve zones comprising ceramic-ceramic composite material and zones comprising ceramic-ceramic precursor matrix material. In certain instances, it may be advantageous for the conversion of the ceramic precursor matrix to be acompanied by debonding or weakening of the bonds between the ceramic particulate and the final ceramic matrix. Such weakened interfacial bonding may be useful in impeding crack propagation.

The loading of ceramic particles in the final ceramic-ceramic composite may be varied over a wide range depending upon the desired use of the product. For instance, in structural applications a particulate loading of approximately 5 to 40 volume percent, and more preferably 10 to 30 volume percent, may be used. In applications such as armor plating, a high loading of the hardest ceramic phase would be desired. For electrical applications the ratio of particulate to final ceramic matrix may be varied to achieve the desired electrical properties.

EXAMPLES

Examples 1 through 9 illustrate the production of composites comprising dispersions of fine second phase particles in ceramic precursor matrices. In accordance with the present invention, the ceramic precursor matrix of each of these composites is suitable for conversion to a final ceramic matrix by reaction with a matrix reactive species. More specifically, Examples 1 through 5 illustrate the formation of composites by the bulk heating mode. Example 6 shows the local ignition mode. Examples 7 and 8 illustrate the sponge addition mode. Example 9 shows the direct addition mode.

EXAMPLE 1

A mixture of powders comprising 34 percent by weight titanium, 16 percent by weight boron and 50 percent by weight aluminum, is isostatically compacted to 38,000 pounds per square inch. The compacted artifact is then heated in a furnace set at a temperature of 800° C. Upon reaching approximately 670° C., a rapid increase in temperature to approximately 1250° C. is noted. The rate of increase in temperature is very rapid (greater than 900° C. per minute) followed by a fast cool down rate of approximately 400° C. per minute. On subsequent examination, the sample was found to contain a fine dispersion (0.1–3 microns) of substantially unagglomerated titanium diboride second phase particles in an aluminum ceramic precursor matrix.

EXAMPLE 2

A mixture of 20.5 percent titanium, 9.5 percent boron and 70 percent by weight cobalt is isostatically pressed to 40,000 pounds per square inch and heated in a furnace. A highly exothermic reaction occurs at 800° C., with a temperature rise to about 1600° C. Subsequent X-ray analysis identifies the presence of titanium diboride in a cobalt matrix. It is shown here that if sufficient diffusion of the second phase-forming reactants into the solid solvent ceramic precursor can occur, the initiation temperature can be below the melting point of the solvent ceramic precursor, which in this case is 1495° C., and the reaction may initiate in the solid state.

EXAMPLE 3

A mixture of 20.6 percent by weight of titanium, 9.4 percent by weight boron and 70 percent by weight of chromium is compacted to 40,000 pounds per square inch, and then heated in a furnace. A rapid exothermic reaction is noted at approximately 880° C. The resultant composite comprises titanium diboride second phase particles in a chromium ceramic precursor matrix.

EXAMPLE 4

A mixture of 16 percent by weight of aluminum, 56 percent by weight of chromium, 20.6 percent by weight titanium, and 9.4 percent by weight of boron is compacted and subsequently heated in a furnace. On attainment of a temperature of about 620° C., a rapid reaction occurrs, resulting in a temperature increase to over 800° C. and melting of the chromium. The temperature-time curve shows a double peak, indicating an exothermic reaction in aluminum (which typically occurs between 600°–680° C.) and a subsequent reaction in the chromium. The lower melting solvent ceramic precursor therefore acts as a "low temperature initiator" for the reaction, which releases heat and induces further reaction in the higher melting solvent ceramic precursor. The composite produced comprises titanium diboride second phase particles in a ceramic precursor matrix of chromium-aluminum alloy.

EXAMPLE 5

An experiment is conducted whereby molybdenum disilicide second phase is precipitated in an aluminum ceramic precursor matrix. A mixture of approximately 7.5 percent silicon, 12.5 percent molybdenum, and 80 percent aluminum powders by weight is compacted and subsequently heated in a furnace. On attainment of a temperature of approximately 640° C., a sudden exotherm is noted. Subsequent X-ray and SEM analyses confirm the presence of molybdenum disilicide particles in an aluminum ceramic precursor matrix.

EXAMPLE 6

Titanium, boron, and aluminum powders are ball-milled in the proper stoichiometric proportions to provide 60 weight percent titanium diboride second phase in an aluminum ceramic precursor matrix. The mixture is then packed in gooch tubing and isostatically pressed to 40 ksi, forming a compact approximately 1 centimeter in diameter by 5 centimeters long and having a density of 2.39 grams per cubic centimeter. The compact is then placed end to end with a graphite rod in a quartz tube under flowing argon. The graphite rod is heated in a radio frequency field which initiates a reaction at the interface of the compact and the rod. The reaction propagates the length of the compact at a rate of 0.77 centimeters per second. Analysis of the resultant composite reveals a dispersion of substantially unagglomerated titanium diboride second phase particles having an average diameter of approximately 1 micron in an aluminum ceramic precursor matrix.

EXAMPLE 7

239.5 grams of titanium powder, 60.3 grams of carbon black, and 200.2 grams of aluminum powder are ball-milled for 30 minutes, packed in gooch tubing, and isostatically pressed to 40 ksi, forming a green compact 1 inch in diameter by 12 inches long. The compact is placed on two water cooled copper rails in a 4 inch diameter quartz tube under flowing argon. A 1 inch by 1 inch piece of carbon placed next to one end of the compact is induction heated until an exothermic reaction is initiated at the end of the compact. Power to the induction unit heating the carbon is turned off and the reaction is allowed to propagate the length of the compact. When cool, the reacted concentrate, comprising 60 weight percent titanium carbide second phase particles in an aluminum ceramic precursor matrix, is crushed and slowly added to molten aluminum host metal at 770° C. while mechanically stirring. The melt is maintained at 770° C. and stirred vigorously for several minutes. The melt is then fluxed with chlorine gas for 15 minutes, skimmed, and cast. The resultant composite comprises approximately 7.5 volume percent titanium carbide second phase particles in an aluminum final ceramic precursor matrix.

EXAMPLE 8

1,300 grams of composite material, prepared as in Example 7, containing 60 weight percent titanium diboride second phase in an aluminum ceramic precursor matrix are crushed and then added to 2,196 grams of molten aluminum host metal while stirring. The resultant composite comprising about 15 volume percent titanium diboride second phase in an aluminum final ceramic precursor matrix is then cast in a conventional manner.

EXAMPLE 9

Titanium, carbon, and aluminum powders are mixed in a ball mill in the proper stoichiometric proportions to provide 60 weight percent titanium carbide forming reactants and 40 weight percent aluminum solvent ceramic precursor. The mixture is placed in gooch tubing and isostatically pressed to 40 ksi to form a compact. The compact is then added to molten aluminum metal at 750° C. in the proper proportion to yield approximately 10 volume percent titanium carbide second phase in an aluminum ceramic precursor matrix. The resultant composite is then cast in conventional manner. Optical microscopy reveals a substantially uniform dispersion of titanium carbide second phase particles in aluminum ceramic precursor matrix.

The following examples illustrate the reaction of ceramic precursor matricies with various matrix reactive species to form final ceramic-ceramic composites.

EXAMPLE 10

A mixture of Ti, B and Al powders is ball-milled, compacted and reacted to produce a composite sponge comprising 60 weight percent $TiB_2$ second phase in an Al ceramic precursor matrix. This sponge is subsequently added to a molten bath of aluminum host metal at 750° C. to produce a composite comprising 15 weight percent $TiB_2$ second phase in an aluminum final ceramic precursor matrix. The composite is cast into a 6 inch water cooled mold and extruded to a shape at approximately 450° C. The component is then placed in an autoclave at approximately 550° C. under an atmosphere of $N_2$ gas at 30,000 psi. Pressure and temperature are maintained for 12 hours and a product is recovered having an outer surface of $TiB_2$-AlN ceramic-ceramic composite with a central core of $TiB_2$-Al ceramic-ceramic precursor matrix composite. This shaped article exhibits high hardness and temperature stability while maintaining impact resistance.

EXAMPLE 11

A mixture of Ti, B and Al powders is isostatically compacted to 38,000 pounds per square inch as set forth in Example 1 and reacted to form a composite comprising titanium diboride second phase particles in an aluminum ceramic precursor matrix. The composite is then crushed and exposed to a nitrogen reactive species at 30,000 psi and 550° C. for twelve hours to convert the aluminum ceramic precursor matrix of the composite to an aluminum niride final ceramic matrix. A $TiB_2$-AlN ceramic-ceramic final composite is thereby formed.

EXAMPLE 12

Example 11 is repeated, however, the matrix reactive species is oxygen. The final ceramic-ceramic composite comprises titanium diboride second phase particles in a final matrix of $Al_2O_3$ ceramic.

EXAMPLE 13

Example 1 is repeated, except silicon powder is substituted for the aluminum powder whereby the composite comprises $TiB_2$ second phase particles in a silicon ceramic precursor matrix. In turn, the silicon matrix of the composite is reacted with a nitrogen matrix reactive species, at 550° C. and 30,000 psi, thereby forming a $TiB_2$-$Si_3N_4$ final composite.

EXAMPLE 14

Example 13 is repeated, except a gaseous hydrocarbon is used as the matrix reactive species. The silicon matrix of the composite is reacted at 1000° C. and 30,000 psi to form a final ceramic matrix comprising SiC, thereby forming a $TiB_2$-SiC final composite.

It is understood that the above description of the present invention is susceptible to considerable modification, change, and adaption by those skilled in the art, and such modifications, changes and adaptions are intended to be considered to be within the scope of the present invention.

We claim:

1. A method for the production of ceramic-ceramic composite materials comprising precipitating at least one ceramic phase in a ceramic precursor matrix by contacting ceramic forming reactants, in the presence of a non-reactive solvent ceramic precursor in which the ceramic forming reactants are more soluble than ceramic phase, at a temperature at which sufficient diffusion of the reactants into the solvent ceramic precursor occurs to cause reaction of the ceramic forming reactants, raising the temperature above the melting temperature of the solvent ceramic precursor to precipitate a substantially uniform distribution of the ceramic phase in the ceramic precursor matrix, thereby forming a composite material, reacting the ceramic precursor matrix of the composite material with a matrix reactive species to convert at least a portion of the ceramic precursor matrix to a ceramic matrix, and recovering a ceramic-ceramic composite.

2. The method according to claim 1, wherein the ceramic phase is particulate.

3. The method according to claim 2, wherein the particulate ceramic phase is precipitated in-situ.

4. The method according to claim 1, wherein the ceramic forming reactants are contacted in substantially stoichiometric proportions.

5. The method according to claim 1, wherein the matrix reactive species is nitrogen, oxygen, carbon black, graphite, boron nitride, carbon monoxide, carbon dioxide, boron fluoride, boron chloride, methane, boron carbide, or sodium azide.

6. The method according to claim 1, wherein the matrix reactive species is gaseous.

7. The method according to claim 1, wherein the matrix reactive species is liquid.

8. The method according to claim 1, wherein the matrix reactive species is solid.

9. The method according to claim 1, wherein the ceramic precursor matrix is a metal, metal alloy or intermetallic.

10. The method according to claim 1, wherein the composite material is crushed to a powder prior to reaction with the matrix reactive species.

11. The method according to claim 10, wherein the powder is introduced into a plasma spray comprising the matrix reactive species.

12. A method for the formation of a ceramic-ceramic composite, the method comprising the steps of:
   (a) preparing a mixture of ceramic phase forming reactants and a substantially non-reactive solvent ceramic precursor in which the ceramic phase forming reactants are more soluble than the ceramic phase;
   (b) heating the mixture to a reaction initiation temperature approximating the melting point of the solvent ceramic precursor to initiate an exothermic reaction;
   (c) permitting the exothermic reaction to further heat the mixture and to form a substantially uniform distribution of ceramic particles in a ceramic precursor matrix;
   (d) reacting the ceramic precursor matrix with a matrix reactive species to convert at least a portion of the ceramic precursor matrix to a ceramic matrix; and
   (e) recovering a ceramic-ceramic composite comprising ceramic particles in a final ceramic matrix.

13. The method of according to claim 12, wherein the matrix reactive species comprises nitrogen, oxygen, carbon black, graphite, boron nitride, carbon monoxide, carbon dioxide, boron fluoride, boron chloride, methane, boron carbide, or sodium azide.

14. The method according to claim 12, wherein the matrix reactive species is gaseous.

15. The method according to claim 12, wherein the matrix reactive species is liquid.

16. The method according to claim 12, wherein the matrix reactive species is solid.

17. The method of claim 12, wherein the ceramic precursor matrix is a metal, metal alloy or intermetallic.

18. The method according to claim 12, wherein at least one ceramic phase forming reactant is a transition metal of the third to sixth groups of the Periodic Table.

19. The method according to claim 12 wherein the ceramic particles are an oxide, nitride, boride, carbide, silicide, oxynitride, sulfide, or oxysulfide.

20. The method according to claim 12 wherein the final ceramic matrix is an oxide, nitride, boride, carbide, silicide, oxynitride, sulfide, or oxysulfide.

21. The method according to claim 12 wherein at least one ceramic phase forming reactant is aluminum, titanium, silicon, boron, carbon, sulfur, tantalum, thorium, yttrium, cobalt, nickel, molybdenum, tungsten, vanadium, zirconium, niobium, hafnium, magnesium, scandium, lanthanum, chromium, oxygen, nitrogen, lithium, beryllium, iron, manganese, zinc, tin, copper, silver, gold, platinum, or a rare earth element.

22. The method according to claim 12 wherein the solvent ceramic precursor is aluminum, nickel, titanium, vanadium, chromium, manganese, cobalt, iron, silicon, molybdenum, beryllium, niobium, tantalum, hafnium, zirconium, magnesium, tin, tungsten, or an alloy of such metals.

23. The method according to claim 12 wherein the ceramic phase forming reactants and the solvent ceramic precursor are provided as individual elements.

24. The method accordiing to claim 12 wherein the exothermic reaction takes place in a liquid state.

25. The method according to claim 12 wherein the ceramic particles are comprised of titanium diboride, zirconium diboride, zirconium disilicide, titanium oxide, titanium carbide, or titanium nitride.

26. The method according to claim 25 wherein the final ceramic matrix is comprised at least partially of aluminum nitride, aluminum oxide, silicon nitride, silicon carbide, titanium nitride or titanium carbide.

27. The method according to claim 26 wherein the ceramic particle size is from about 0.1 to about 10 microns.

28. The method according to claim 26 wherein the ceramic particles comprise from about 10 to about 70 volume percent of the composite.

29. The method according to claim 12, wherein the ceramic phase forming reactants are each provided as an alloy of the solvent ceramic precursor.

30. The method according to claim 12 wherein at least one ceramic phase forming reactant is provided as an individual element, and the other second phase forming reactants are provided as alloys of the solvent ceramic precursor.

31. The method according to claim 12 wherein the ceramic phase forming reactants and the solvent ceramic precursor are provided as powders.

32. The method according to claim 12, wherein the ceramic phase forming reactants and the solvent ceramic precursor are provided as powders that are premixed and compacted.

33. A method for the production of ceramic-ceramic composite materials, the method comprising producing a precipitate of at least one ceramic phase material in a ceramic precursor matrix by contacting reactive ceramic phase forming reactants in the presence of a solvent ceramic precursor in which the ceramic phase forming reactants are more soluble than the ceramic phase material, at a first temperature at which sufficient diffusion of the ceramic phase forming reactants into the solvent ceramic precursor occurs to cause a ceramic phase forming reaction to thereby precipitate ceramic particles in the solvent ceramic precursor, producing a first composite material comprising finely-divided ceramic particles in the ceramic precursor matrix, forming a molten mass by introducing the first composite material into a molten host metal in which the ceramic particles are substantially insoluble at a second temperature at which the ceramic precursor matrix is dissolved in the host metal comprising a metal, metal alloy, or intermetallic to form a second composite comprising a substantially uniform dispersion of the ceramic particles in a final ceramic precursor matrix, reacting the final ceramic precursor matrix of the second composite with a matrix reactive species to convert at least a portion of the final ceramic precursor matrix to ceramic; and recovering a ceramic-ceramic composite.

34. The method according to claim 33, wherein the matrix reactive species is nitrogen, oxygen, carbon black, graphite, boron nitride, carbon monoxide, carbon dioxide, boron fluoride, boron chloride, methane, boron carbide, or sodium azide.

35. The method according to claim 33, wherein the second composite is formed to a shape by casting, extrusion, forging, rolling, machining, or a combination thereof, prior to the reaction of the final ceramic precursor matrix with the matrix reactive species.

36. A method for the formation of a ceramic-ceramic composite, the method comprising the steps of:
 (a) preparing a mixture of ceramic phase forming reactants and a substantially non-reactive solvent ceramic precursor;
 (b) adding the mixture to a molten matrix metal, metal alloy or intermetallic at a temperature at which sufficient diffusion of the ceramic phase forming reactants into the solvent ceramic precursor occurs to initiate an exothermic reaction of the ceramic phase forming reactants;
 (c) permitting the exothermic reaction to further heat the mixture, consuming the ceramic phase forming reactants, and to form a composite comprising a distribution of ceramic particles in a ceramic precursor matrix;
 (d) reacting the ceramic precursor matrix of the composite with a matrix reactive species to convert at least a portion of the ceramic precursor matrix to ceramic; and
 (e) recovering a ceramic-ceramic composite.

37. The method according to claim 36, wherein the matrix reactive species is nitrogen, oxygen, carbon black, graphite, boron nitride, carbon monoxide, carbon dioxide, boron fluoride, boron chloride, methane, boron carbide, or sodium azide.

38. The method according to claim 36, wherein the composite comprising a distribution of ceramic particles in a ceramic precursor matrix is formed to a shape by casting, extrusion, forging, rolling, machining, or a combination thereof, prior to the reaction of the ceramic precursor matrix with the matrix reactive species.

39. A method for the formation of a ceramic-ceramic composite, the method comprising precipitating at least one ceramic phase material in a substantial volume fraction of a solvent ceramic precursor by locally igniting a mixture comprising ceramic phase forming reactants and a substantially non-reactive solvent ceramic precursor in which the ceramic phase forming reactants are more soluble than the ceramic phase material, at a temperature at which sufficient diffusion of the ceramic phase forming reactants into the solvent ceramic precursor occurs to cause a substantially isothermal propagating ceramic phase forming reaction of the reactants to thereby precipitate ceramic particles in the solvent ceramic precursor so as to produce a porous composite comprising finely-divided ceramic particles in a ceramic precursor matrix, and reacting the ceramic precursor matrix of the porous composite with a matrix reactive species to convert at least a portion of the ceramic precursor matrix to ceramic, and recovering a ceramic-ceramic composite.

40. The method according to claim 39, wherein the matrix reactive species is nitrogen, oxygen, carbon black, graphite, boron nitride, carbon monoxide, carbon dioxide, boron fluoride, boron chloride, methane, boron carbide, or sodium azide.

41. The method according to claim 39, wherein the porous composite comprising finely-divided ceramic particles in a ceramic precursor matrix is crushed to a powder prior to reaction with the matrix reactive species.

42. The method according to claim 41, wherein the powder is introduced into a plasma spray comprising the matrix reactive species.

* * * * *